(12) United States Patent
King et al.

(10) Patent No.: US 6,555,505 B1
(45) Date of Patent: Apr. 29, 2003

(54) FOAMED ACIDIZING FLUIDS, ADDITIVES AND METHODS OF ACIDIZING SUBTERRANEAN ZONES

(75) Inventors: Karen L. King, Duncan, OK (US); Jiten Chatterji, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/094,577

(22) Filed: Mar. 8, 2002

(51) Int. Cl.$^7$ .............................. C09K 3/00; E21B 43/16
(52) U.S. Cl. ...................... 507/202; 507/102; 507/204; 507/923; 507/933; 166/307; 166/308
(58) Field of Search ................................ 507/102, 202, 507/923, 933, 204; 166/307, 308

(56) References Cited

U.S. PATENT DOCUMENTS

| | | | | |
|---|---|---|---|---|
| 1,608,686 A | * | 11/1926 | Weil ................................ 426/7 |
| 3,926,650 A | | 12/1975 | Lange et al. .................. 106/90 |
| 5,049,397 A | * | 9/1991 | Kolbeck et al. ............... 426/7 |
| 5,133,409 A | | 7/1992 | Bour et al. ................... 166/293 |
| 5,147,565 A | | 9/1992 | Bour et al. ............... 252/8.551 |
| 5,569,324 A | | 10/1996 | Totten et al. ................ 106/696 |
| 5,580,378 A | | 12/1996 | Shulman ...................... 106/677 |
| 5,588,489 A | | 12/1996 | Chatterji et al. ............ 166/293 |
| 5,696,059 A | | 12/1997 | Onan et al. .................. 507/269 |
| 5,711,801 A | | 1/1998 | Chatterji et al. ............ 106/789 |
| 5,897,699 A | | 4/1999 | Chatterji et al. ............ 106/678 |
| 6,063,738 A | | 5/2000 | Chatterji et al. ............ 507/269 |
| 6,367,550 B1 | * | 4/2002 | Chatterji et al. ............ 507/202 |
| 6,454,004 B2 | * | 9/2002 | Reddy et al. ................ 507/202 |
| 6,454,008 B1 | * | 9/2002 | Chatterji et al. ............ 507/202 |

* cited by examiner

*Primary Examiner*—Philip Tucker
(74) *Attorney, Agent, or Firm*—Robert A. Kent; C. Clark Dougherty, Jr.

(57) ABSTRACT

The present invention provides environmentally safe foamed acidizing fluids for acidizing subterranean zones, additives for foaming and stabilizing foamed acidizing fluids and methods of acidizing subterranean zones. The foamed acidizing fluids are basically comprised of an aqueous acid solution, sufficient gas to form a foam and an effective amount of an additive for foaming and stabilizing the aqueous acid solution comprised of hydrolyzed keratin.

22 Claims, No Drawings

FOAMED ACIDIZING FLUIDS, ADDITIVES AND METHODS OF ACIDIZING SUBTERRANEAN ZONES

BACKGROUND OF THE INVENTION

1. Field of the Invention

The present invention relates to foamed acidizing fluids, additives for foaming the acidizing fluids and methods of acidizing subterranean zones.

2. Description of the Prior Art

The treatments of subterranean hydrocarbon containing formations penetrated by well bores with aqueous acidizing fluids to stimulate the production of hydrocarbons therefrom are well known to those skilled in the art. One such acidizing treatment involves the introduction of an aqueous acidizing fluid into the subterranean formation under pressure so that the acidizing fluid flows through the pore spaces of the formation. The acidizing fluid reacts with acid soluble materials contained in the formation thereby increasing the size of the pore spaces and the permeability of the formation.

Another production stimulation treatment known as fracture-acidizing involves the formation of one or more fractures in the formation and the introduction of an aqueous acidizing fluid into the fractures to etch the fractures faces whereby flow channels are formed when the fractures close. The aqueous acidizing fluid also enlarges the pore spaces in the fracture faces and in the formation.

In carrying out acidizing and fracture-acidizing treatments in subterranean zones, the acidizing fluid utilized must often be lightweight to prevent excessive hydrostatic pressure from being exerted on the subterranean zone. As a result, a variety of lightweight acidizing fluids have heretofore been developed and used including foamed acidizing fluids. In addition to being lightweight, a foamed acidizing fluid contains compressed gas which improves the ability of the acidizing fluid to backflow out of a subterranean zone which has been acidized or fracture-acidized and recovered.

Foamed acidizing and fracture-acidizing fluids have heretofore included various surfactants which function to facilitate the foaming of the fluids and stabilize the foams formed when gases are mixed therewith. However, the heretofore used foaming and foam stabilizing surfactant additives have not met complete environmental requirements. That is, when the foaming and stabilizing surfactants find their way into water in the environment, they do not fully degrade which can result in interference with aquatic lifecycles.

Thus, there are needs for improved foamed acidizing fluids, improved acidizing fluid foaming and stabilizing additives which are harmless to the environment and improved methods of acidizing subterranean zones.

SUMMARY OF THE INVENTION

The present invention provides improved foamed acidizing fluids for acidizing or fracture-acidizing subterranean zones, improved acidizing fluid foaming and stabilizing additives which are harmless to the environment and improved methods of acidizing or fracture-acidizing subterranean zones which meet the needs described above and overcome the deficiencies of the prior art. The improved foamed acidizing fluids are basically comprised of an aqueous acid solution, sufficient gas to form a foam and an effective amount of an environmentally harmless additive for foaming and stabilizing the gelled aqueous acid solution comprised of hydrolyzed keratin.

The aqueous acid solution foaming and stabilizing additive of this invention which is harmless to the environment is hydrolyzed keratin. The additive is preferably dissolved in water to form an aqueous solution which is added to the aqueous acid solution to be foamed along with a gas for foaming the aqueous acid solution.

The methods of the present invention for acidizing or fracture-acidizing subterranean zones penetrated by well bores are basically comprised of the following steps. A foamed acidizing fluid is prepared comprised of an aqueous acid solution, sufficient gas to form a foam and an effective amount of an additive for foaming and stabilizing the gelled aqueous acid solution comprised of hydrolyzed keratin. Thereafter, the subterranean zone is contacted with the foamed acidizing fluid.

The objects, features and advantages of the present invention will be readily apparent to those skilled in the art upon a reading of the description of preferred embodiments which follows.

DESCRIPTION OF PREFERRED EMBODIMENTS

As mentioned above, the improved foamed acidizing fluids of this invention are useful for performing acidizing and fracture-acidizing treatments in subterranean zones. The foamed acidizing fluids are basically comprised of an aqueous acid solution, sufficient gas to form a foam and an effective amount of an additive for foaming and stabilizing the gelled aqueous acid solution comprised of hydrolyzed keratin.

A variety of acids can be employed in the aqueous acid solution utilized in accordance with the present intention. Examples of suitable acids include, but are not limited to, hydrochloric acid, hydrofluoric acid, acetic acid, formic acid, glycolic acid and mixtures of such acids. Of these, hydrochloric acid is preferred and an aqueous hydrochloric acid solution having a hydrochloric acid concentration in the range of from about 5% to about 35% by weight of the solution is preferred. The most preferred aqueous acid solution for use in accordance with the present invention is a hydrochloric acid solution having a hydrochloric acid concentration in the range of from about 15% to about 35% by weight of the solution.

The water utilized to form the aqueous acid solution can be any aqueous fluid which does not adversely react with the acid, or other components in the foamed acidizing fluid. For example, the water can be fresh water, brine, salt containing water solutions such as sodium chloride solutions, potassium chloride solutions, ammonium chloride solutions, seawater, brackish water or the like. The aqueous acid solution generally also includes one or more corrosion inhibitors and corrosion inhibitor intensifiers to prevent the aqueous acid solution from corroding metal pumps, tubular goods and the like. Such corrosion inhibitors, corrosion inhibitor intensifiers and other additives which can be included in the aqueous acid solution are well known to those skilled in the art.

The gas utilized for forming the foamed acidizing fluids of this invention can be air or nitrogen with nitrogen being preferred. The gas is present in an amount sufficient to foam the gelled aqueous acid solution, generally in an amount in the range of from about 20% to about 80% by volume of the aqueous acid solution.

As mentioned above, the environmentally degradable additive for foaming and stabilizing the gelled aqueous acid solution to produce the foamed acidizing fluid of this invention is hydrolyzed keratin. Hydrolyzed keratin is manufactured by the base hydrolysis of hoofs and horn meal by lime in an autoclave to produce a hydrolyzed protein. The protein is commercially available as a free-flowing powder that contains about 85% protein. The non-protein portion of the powder consists of about 0.58% insoluble material with the remainder being soluble non-protein materials primarily made up of calcium sulfate, magnesium sulfate and potassium sulfate.

The hydrolyzed keratin protein powder is preferably predissolved in fresh water in an amount of about 40% by weight of the solution. In addition to water for dissolving the hydrolyzed keratin, the additive can include other components such as one or more freezing and pour point depressants to prevent it from freezing during storage or handling in cold weather and lower its pour point. Preferably, the depressants are selected from the group of propylene glycol, sodium chloride and mixtures thereof. The depressant or depressants utilized are generally present in the additive solution in an amount in the range of from about 0.1% to about 0.5% by weight of the solution.

The hydrolyzed keratin is generally included in a foamed acidizing fluid of this invention in an amount in the range of from about 0.08% to about 0.4% by weight of the aqueous acid solution therein (from about 0.2% to about 1% of a 40% by weight solution of the hydrolyzed keratin).

A gelling agent for providing viscosity to the aqueous acid solution can optionally be included in the foamed acidizing fluid so that solids generated by the reaction of the acid with formation materials are suspended in the fluid and removed therewith. A suitable gelling agent which can be utilized is comprised of a copolymer of about 5% to about 60% by weight acrylamide and the remainder selected from the group consisting of dialkylaminoethylmethacrylate, trialkylaminoethylmethacrylate quaternary salt and acrylamido alkane sulfonic acid. The trialkylaminoethylmethacrylate quaternary salt monomer has the structural formula:

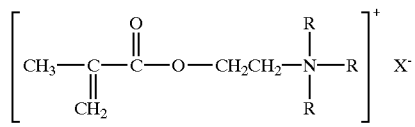

wherein R is methyl or ethyl and X$^-$ is Cl, Br, I or CH$_3$OSO$_3$. The dialkylaminoethylmethacrylate monomer has the structural formula:

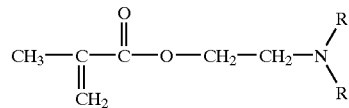

wherein R is methyl or ethyl. The acrylamido alkane sulfonic acid has the structural formula:

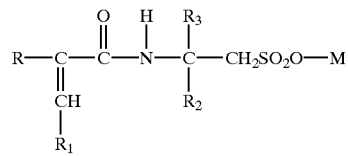

wherein R, R$_1$, R$_2$ and R$_3$ are independently selected from hydrogen or alkyl having from 1 to 5 carbons and M is selected from hydrogen, sodium, potassium or ammonium.

Another suitable gelling agent which can be utilized is a copolymer of a quaternary ammonium salt and acrylamide, methylacrylamide or a monomer represented by the structural formula:

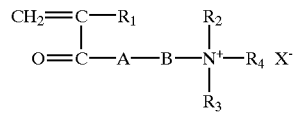

wherein R$_1$ is hydrogen or methyl, R$_2$ and R$_3$ are each an alkyl group having 1 or 2 carbon atoms, R$_4$ is hydrogen or an alkyl group having 1 or 2 carbon atoms, A is an oxygen atom or —NH, B is an alkyl group having 2 to 4 carbon atoms or a hydroxypropyl group and X is a counter anion. Such a gelling agent is more fully described in U.S. Pat. No. 5,332,507 issued on Jul. 26, 1994 to Braden et al. which is incorporated herein by reference thereto.

Yet another suitable gelling agent which can be utilized is comprised of a solution of a water soluble organic solvent having one or more ethoxylated fatty amines dissolved therein. Such a gelling agent is more fully described in U.S. Pat. No. 4,324,669 issued on Apr. 13, 1982 to Norman et al. which is incorporated herein by reference thereto.

The gelling agent utilized is generally included in a foamed acidizing fluid of this invention in an amount in the range of from about 0.4% to about 5% by weight of the aqueous acid solution therein.

The methods of this invention for acidizing or fracture-acidizing a subterranean zone penetrated by a well bore are basically comprised of the following steps. A foamed acidizing fluid is prepared comprised of an aqueous acid solution, sufficient gas to form a foam and an effective amount of an additive for foaming and stabilizing the aqueous acid solution comprised of hydrolyzed keratin. Thereafter, the subterranean zone is contacted with the foamed acidizing fluid.

A preferred foamed acidizing fluid of this invention for acidizing or fracture-acidizing subterranean zones comprises: an aqueous hydrochloric acid solution; sufficient nitrogen gas to form a foam; and an effective amount of an additive for foaming and stabilizing the aqueous acid solution comprised of hydrolyzed keratin.

Another preferred foamed acidizing fluid of this invention for acidizing or fracture-acidizing subterranean zones comprises: an aqueous hydrochloric acid solution; a gelling agent comprised of a copolymer of about 5% to about 60% by weight acrylamide and the remainder selected from the group of dialkylaminoethylacrylate, trialkylaminoethylmethacrylate quaternary salt and acrylamido alkane sulfonic acid; sufficient nitrogen to form a foam; and an effective amount of an additive for foaming and stabilizing the aqueous acid solution comprised of hydrolyzed keratin.

A preferred method of acidizing or fracture-acidizing a subterranean zone penetrated by a well bore comprises the steps of: (a) preparing a foamed acidizing fluid comprised of an aqueous hydrochloric acid solution, sufficient nitrogen gas to form a foam and an effective amount of an additive for foaming and stabilizing the aqueous acid solution comprised of hydrolyzed keratin; and (b) contacting the subterranean zone with the foamed acidizing fluid.

Another preferred method of acidizing or fracture-acidizing a subterranean zone penetrated by a well bore comprises the steps of: (a) preparing a foamed acidizing fluid comprised of an aqueous hydrochloric acid solution, a gelling agent comprised of a copolymer of about 5% to about 60% by weight acrylamide and the remainder selected from the group of dialkylaminoethylacrylate, trialkylaminoethylmethacrylate quaternary salt and acrylamido alkane sulfonic acid, sufficient nitrogen to form a foam, and an effective amount of an additive for foaming and stabilizing the aqueous acid solution comprised of hydrolyzed keratin; and (b) contacting the subterranean zone with the foamed acidizing fluid.

A preferred environmentally harmless additive of this invention for foaming and stabilizing an aqueous acid solution is comprised of hydrolyzed keratin.

Another preferred environmentally harmless additive of this invention for foaming and stabilizing an aqueous acid solution is comprised of an aqueous solution containing 40% by weight of dissolved hydrolyzed keratin.

Thus, the present invention is well adapted to carry out the objects and attain the ends and advantages mentioned as well as those which are inherent therein. While numerous changes may be made by those skilled in the art; such changes are encompassed within the spirit of this invention as defined by the appended claims.

What is claimed is:

1. An improved foamed acidizing fluid for acidizing or fracture-acidizing subterranean zones comprising:

an aqueous acid solution;

sufficient gas to form a foam; and an effective amount of an additive for foaming and stabilizing said aqueous acid solution comprised of hydrolyzed keratin.

2. The foamed acidizing fluid of claim 1 wherein said aqueous acid solution is selected from the group consisting of hydrochloric acid, hydrofluoric acid, acetic acid, formic acid, glycolic acid and mixtures of such acids.

3. The foamed acidizing fluid of claim 1 wherein said aqueous acid solution is a hydrochloric acid solution having a hydrochloric acid concentration in the range of from about 5% to about 35% by weight of said solution.

4. The foamed acidizing fluid of claim 1 wherein said gas in said foamed acidizing fluid is selected from the group of air and nitrogen.

5. The foamed acidizing fluid of claim 1 wherein said gas in said foamed acidizing fluid is present in an amount in the range of from about 20% to about 80% by volume of said aqueous acid solution therein.

6. The foamed acidizing fluid of claim 1 wherein said hydrolyzed keratin in said foamed acidizing fluid is present in an amount in the range of from about 0.08% to about 0.4% by weight of said aqueous acid solution therein.

7. The foamed acidizing fluid of claim 1 which further comprises a gelling agent.

8. The foamed acidizing fluid of claim 7 wherein said gelling agent is a copolymer of about 5% to about 60% by weight acrylamide and the remainder selected from the group consisting of dialkylaminoethylmethacrylate, trialkylaminoethylmethacrylate quaternary salt and acrylamido alkane sulfonic acid.

9. The foamed acidizing fluid of claim 7 wherein said gelling agent is a copolymer of a quaternary ammonium salt and acrylamide, methacrylamide and a monomer represented by the general formula

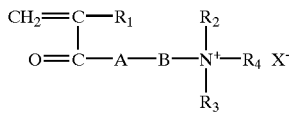

wherein $R_1$ is H or $CH_3$; $R_2$ and $R_3$ are each an alkyl group having 1 or 2 carbon atoms, $R_4$ is H or an alkyl group having 1 or 2 carbon atoms, A is an oxygen atom or —NH, B is an alkyl group having 2 to 4 carbon atoms or a hydroxypropyl group and X is a counter anion.

10. The foamed acidizing fluid of claim 7 wherein said gelling agent is a solution of a water soluble organic solvent and one or more ethoxylated fatty amines.

11. The foamed acidizing fluid of claim 7 wherein said gelling agent is present in an amount in the range of from about 0.4% to about 5% by weight of said aqueous acid solution therein.

12. A method of acidizing or fracture-acidizing a subterranean zone penetrated by a well bore comprising the steps of:

(a) preparing a foamed acidizing fluid comprised of an aqueous acid solution, sufficient gas to form a foam and an effective amount of an additive for foaming and stabilizing said aqueous acid solution comprised of hydrolyzed keratin; and (b) contacting said subterranean zone with said foamed acidizing fluid.

13. The method of claim 12 wherein said aqueous acid solution in said foamed acidizing fluid is selected from the group consisting of hydrochloric acid, hydrofluoric acid, acetic acid, formic acid, glycolic acid and mixtures of such acids.

14. The method of claim 12 wherein said aqueous acid solution in said foamed acidizing fluid is a hydrochloric acid solution having a hydrochloric acid concentration in the range of from about 5% to about 35% by weight of said solution.

15. The method of claim 12 wherein said gas in said foamed acidizing fluid is selected from the group of air and nitrogen.

16. The method of claim 12 wherein said gas in said foamed acidizing fluid is present in an amount in the range of from about 20% to about 80% by volume of said aqueous acid solution therein.

17. The method of claim 12 wherein said hydrolyzed keratin in said foamed acidizing fluid is present in an amount in the range of from about 0.08% to about 0.4% by weight of said aqueous acid solution therein.

18. The method of claim 12 wherein said foamed acidizing fluid further comprises a gelling agent.

19. The method of claim 18 wherein said gelling agent in said foamed acidizing fluid is a copolymer of about 5% to about 60% by weight acrylamide and the remainder selected from the group consisting of dialkylaminoethylmethacrylate, trialkylaminoethylmethacrylate quaternary salts and acrylamido alkane sulfonic acid.

20. The method of claim 18 wherein said gelling agent in said foamed acidizing fluid is a copolymer of a quaternary ammonium salt and acrylamide, methacrylamide and a monomer represented by the general formula

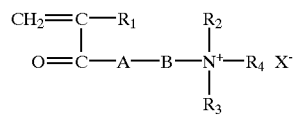

wherein $R_1$ is H or $CH_3$; $R_2$ and $R_3$ are each an alkyl group having 1 or 2 carbon atoms, $R_4$ is H or an alkyl group having 1 or 2 carbon atoms, A is an oxygen atom or —NH, B is an alkyl group having 2 to 4 carbon atoms or a hydroxypropyl group and X is a counter anion.

21. The method of claim 18 wherein said gelling agent in said foamed acidizing fluid is a solution of a water soluble organic solvent and one or more ethoxylated fatty amines.

22. The method of claim 18 wherein said gelling agent in said foamed acidizing fluid is present in an amount in the range of from about 0.4% to about 5% by weight of said aqueous acid solution therein.

* * * * *